3,352,642
STABILIZATION OF OZONE
Lawrence J. Heidt, Arlington, and Vincent R. Landi, Brookline, Mass., assignors to Massachusetts Institute of Technology, Cambridge, Mass., a corporation of Massachusetts
No Drawing. Filed June 29, 1964, Ser. No. 378,990
15 Claims. (Cl. 23—222)

This invention relates to a method for the stabilization of ozone and in particular to a method whereby ozone can be stored and transported with a much slower rate of decomposition than was heretofore thought possible.

Ozone ($O_3$) is an unstable blue gas which is formed photochemically in nature in the earth's stratosphere but which exists only in great dilution with air or oxygen at ground levels. At $-112°$ C. ozone condenses to a dark blue liquid which is easily exploded, as are concentrated ozone-oxygen mixtures (above about 30% ozone) in either the liquid or the vapor state. Explosions are initiated by small amounts of organic matter, shocks, electric sparks, and sudden changes in temperature and pressure. The very explosive nature of ozone has suggested its use as a component in rocket fuels. Ozone is a potent germicide, a powerful oxidant in organic and inorganic reactions, and has also been found useful in the treatment of water supplies and industrial wastes as well as in the deodorization of air and sewage gases.

Ozone is commercially produced from air or oxygen by means of an apparatus known as an ozonizer which utilizes an electrical discharge known as the ozonator discharge, to produce the $O_3$ molecule. The ozone produced thereby contains those impurities which are present in ordinary air plus small quantities of nitrogen pentoxide ($N_2O_5$) and nitrous oxide ($N_2O$). The mole ratio of nitrogen pentoxide to ozone under typical conditions is in the range of 1-2%. However, with moist air the proportion of nitrogen pentoxide rises and it combines with the water vapor present to form nitric acid ($HNO_3$) which causes severe corrosion of the metal surfaces which it contacts. Ozone relatively free of impurities can be prepared by the ozonization of pure dry oxygen. One of the major problems which has been encountered in the production of ozone has been the preparation and utilization of high purity oxygen to produce a high purity ozone. This is extremely important in view of the fact that ozone is highly unstable in the presence of even the slightest amount of impurity such as nitrogen pentoxide.

Ozone, being quite unstable, decomposes to biatomic oxygen. The decomposition is slow at room temperature and low concentrations, but is greatly accelerated by heat, being almost instantaneous at temperatures of several hundred degrees centigrade. The decomposition has been reported to be catalyzed by moisture, silver, platinum, and some other metals as well as some metallic oxides, soda lime, bromine, chlorine, and nitrogen pentoxide. Thus, it can be seen that the purity of the product is a highly important factor in its stability. Much work has done to improve the methods of producing ozone in order to obtain a high purity stable product. This has been a very expensive and largely unsuccessful venture thus far. The importance of stabilizing ozone cannot be overemphasized in view of the many possible uses to which it could be put were it not for its instability and difficulty in handling.

It is, therefore, an object of this invention to provide a means for the stabilization of ozone.

More specifically, it is an object of the present invention to provide a method for the reduction of the rate of decomposition of ozone.

It is likewise an object of the invention to provide a means for the storage of ozone whereby the ozone is stabilized during storage for long periods of time without degradation of its oxidizing properties.

In accordance with these and other objects, the present invention involves the stabilization of ozone through the use of base, and in particular, sodium hydroxide and other sources of hydroxyl-ion. This is a wholly new and surprising approach to the problem of stabilizing ozone. In fact, it has heretofore been generally believed that sodium hydroxide would have the opposite effect upon ozone. For example, the Encyclopedia of Chemical Technology, vol. 9, p. 735, reports that the ozone decomposition reaction is greatly accelerated by increasing the hydroxyl-ion concentration. Other references are made in the same volume and article on ozone to the supposedly detrimental effect of sodium hydroxide on the stability of ozone. It is also reported in the article that the decomposition of ozone is more rapid in aqueous solution than in the gaseous state, and that the decomposition is powerfully catalyzed by hydroxyl-ion. In an article by M. L. Kilpatrick, Claude C. Herrick and M. Kilpatrick, Journal of the American Chemical Society, vol. 78, at p. 1788, the authors reported that the rate of decomposition of ozone increases as the hydroxyl-ion increases. It is important to note that they employed concentrations of NaOH in the range from $10^{-6}$ N to $10^{-4}$ N in making their decomposition study, since, by way of contrast, it has been found that the use of NaOH at much higher concentrations results in a startling increase in the stability of the ozone. The work of Kilpatrick et al. has been cited by Clark E. Thorp, of the Armour Research Foundation, Chicago, Illinois in his Bibliography of Ozone Technology, vol. 2, p. 44, in which the statement is made that "with few exceptions, the decomposition of ozone increases with increasing ion concentration." Thus, the consensus of workers in the field of ozone technology has been that the stability of ozone is decreased as the concentration of hydroxyl-ion is increased. This invention, which is based on the stabilization of ozone by the addition of hydroxyl-ion, is, therefore, all the more novel and unexpected in view of the foregoing.

It has been found that ozone is increasingly stable with increasing base concentration above $10^{-4}$ N NaOH, and greatly stabilized in the range from 1 N to 20 N NaOH. Ozone and Ozonide ($O_3^-$), the anion of the strong acid $HO_3$, were produced as a result of the absorption of light by hydrogen peroxide and sodium persulfate in aqueous sodium hydroxide. Flash photolysis was used as a light source in initiating the reaction. The optical density (O.D.) of the system was measured by means of a spectrophotometer at the light absorption peaks of ozone and ozonide at 2600 A. and 4300 A. respectively. The stability of ozone as measured by its thermal half life ($T/2$) (the time required for the ozone concentration to decrease by one-half from its initial concentration) was greatly increased with an increase in base concentration. The ozonide also was stabilized, although to a lesser degree than the ozone. The effect of NaOH concentration on the stability of ozone in a sodium hydroxide-hydrogen peroxide solution is shown in Table I.

Table I

| NaOH (concentration): | $O_3$—$T/2$ (seconds) |
|---|---|
| $10^{-4}$ N | 0.02 |
| $10^{-2}$ N | 0.07 |
| $10^{-1}$ N | 4.76 |
| $2.5 \times 10^{-1}$ N | 9.04 |
| $5 \times 10^{-1}$ N | 24.8 |
| 1.0 N | 110. |
| 7.0 N | 2000. |

It can be seen from Table I that as the NaOH concentration is increased from $10^{-4}$ to 7.0 N the thermal half life of the ozone in solution, as calculated from optical density measurements, is increased from 0.02 second to 2000 seconds. This is in marked contrast to the results of work done by others in the field (Kilpatrick et al.) which shows a decrease in ozone stability as the NaOH concentration is increased from $10^{-6}$ N to $10^{-4}$ N. The ozone in the strongly basic solution (7 N NaOH) decomposed smoothly with no untoward effects even when the solution was rapidly heated, shaken and boiled. Similar experiments carried out with concentrations of potassium hydroxide up to 14 N gave results similar to those obtained with sodium hydroxide.

Table II shows the effect of base concentration on the stability of ozone in a sodium hydroxide-sodium persulfate solution. Optical density measurements at 2600 A. were made and from these were calculated the thermal half lives presented in Table II.

Table II

| NaOH (concentration): | $O_3$—$T2$ (seconds) |
|---|---|
| $10^{-3}$ N | 0.001 |
| $10^{-2.5}$ N | 0.01 |
| 7 N | 2500 |

In the experiments which resulted in the data shown in Tables I and II, ozone was produced from hydrogen peroxide and sodium persulfate respectively, by means of flash photolysis. There is in experiments of this type the inherent, although doubtful, possibility that the hydrogen peroxide and sodium persulfate exercised a protective effect upon the ozone and thus were responsible for its greatly increased stability rather than the NaOH. To confirm the theory that NaOH was responsible for the stabilization of ozone an experiment was performed in which both the hydrogen peroxide and sodium persulfate were eliminated. Ozone produced by an ozonizer, was bubbled through distilled water containing various concentrations of NaOH. The thermal half lives of ozone in various concentrations of NaOH were calculated, as before, with startling results. Concentrations of NaOH up to 20 N were employed and the half lives were measured in minutes rather than seconds. Table III shows the very great stabilizing effect of NaOH in high concentrations upon ozone in water at 23° C.

Table III

| NaOH (concentration): | $O_3$—$T/2$ (minutes) |
|---|---|
| 1 N | 3 |
| 5 N | 40 |
| 10 N | 2000 |
| 20 N | 5000 |

In accordance with this inventon liquid ozone or ozone dissolved in other solutions can be stabilized by the addition thereto of sodium hydroxide or other sources of hydroxyl-ion such as potassium hydroxide, alkali metal hydroxides such as rubidium hydroxide, cesium hydroxide, and lithium hydroxide, and alkaline earth hydroxides such as barium hydroxide. Methods of stabilizing ozone for storage and transportation other than by the addition of solutions of strongly basic compounds should be effective provided that hydroxyl-ion is present to contact the ozone. For example, containers coated with a highly alkaline material such as an alkaline glass should serve as a stabilizing influence on the ozone. Iron containers could be treated with strong base and rendered inactive to prevent any reaction between the ozone and the iron. In other words, surface concentrations of a two dimensional or molecular-depth type exercise a protective effect upon the ozone. Any non-readily oxidizable basic groups such as $(OH^-)$ or $O^{-2}$ on the surface of the metal walls of a container would not readily react with the ozone and, thus, in effect, would stabilize it. An iron container, for example, if treated with NaOH would produce a surface layer of iron oxide, the iron being in the completely oxidized oxide form with oxygen in the −2 oxidation state. Thus, the ozone which contacts this highly oxidized layer should not react with it and should not decompose.

It is contemplated that the ozone stabilized and stored according to this invention can be made available for use in the pure form by various means. For example, the alkaline ozone solution can be distilled at low temperatures to separate the ozone from the NaOH solution. Ozone may be run through alkaline dehydrating agents such as sodium hydroxide pellets, potassium hydroxide pellets, barium oxide, magnesium oxide, and calcium oxide to remove any water present in applications where pure ozone is required. Pipes and other vessels used in the transportation of flowing ozone can be made of alkaline materials such as alkaline glass or alkaline glass-lined materials. In other words, the ozone may be safely handled and stored provided it is in an alkaline medium or alkaline surroundings until used. It may be used in the pure form by presently available separation techniques provided that it is kept in a strongly alkaline environment until use.

The preferred embodiments of the invention described in this specification are illustrative only. Various modifications may be made without departing from the spirit and scope of the invention as set forth in the appended claims.

What is claimed is:

1. The process of stabilizing ozone comprising the step of storing said ozone in a container, the walls of said container being lined with a highly alkaline material.

2. The process of stabilizing ozone comprising the step of storing said ozone in a container, the walls of said container being lined with a highly alkaline glass.

3. The process of stabilizing ozone comprising the step of storing said ozone in a container, the walls of said container being rendered inert by reacting them with strong alkali.

4. The process of stabilizing ozone comprising the step of storing said ozone in a container, the walls of said container being rendered inert by reacting them with concentrated NaOH.

5. The process of stabilizing ozone comprising the step of storing said ozone in a container, the walls of said container being rendered inert by reacting them with concentrated KOH.

6. A process of stabilizing ozone which comprises dissolving it in an aqueous solution containing a hydroxyl ion-yielding base in a concentration of at least $10^{-2}$ N.

7. The process of claim 6 wherein the hydroxyl ion-yielding base is a member selected from the group consisting of NaOH, KOH, RbOH, LiOH, CsOH, and $Ba(OH)_2$.

8. The process of claim 7 wherein the concentration of hydroxyl ion-yielding base is from 1 N to 20 N.

9. The process of claim 8 wherein the hydroxyl ion-yielding base is NaOH.

10. The process of claim 8 wherein the hydroxyl ion-yielding base is KOH.

11. A composition for storing ozone under stabilized conditions comprising water, ozone and a hydroxyl ion-yielding base in a concentration of at least $10^{-2}$ N.

12. A composition of claim 11 wherein the concentration of hydroxyl ion-yielding base is from 1 N to 20 N.

13. A composition of claim 12 wherein the hydroxyl ion-yielding base is a member selected from the group consisting of NaOH, KOH, RbOH, LiOH, CsOH and $Ba(OH)_2$.

14. A composition of claim 12 wherein the member is NaOH.

15. A composition of claim 12 wherein the member is KOH.

No references cited.

JOSEPH SCOVRONEK, *Primary Examiner.*

B. S. RICHMAN, *Assistant Examiner.*